(12) United States Patent
Kinoshita

(10) Patent No.: US 9,306,834 B2
(45) Date of Patent: Apr. 5, 2016

(54) PATH FINDING SYSTEM, COMPUTER, CONTROL METHOD, AND PROGRAM

(75) Inventor: Shunichi Kinoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 367 days.

(21) Appl. No.: 13/822,352

(22) PCT Filed: Feb. 14, 2011

(86) PCT No.: PCT/JP2011/052976
§ 371 (c)(1),
(2), (4) Date: Mar. 12, 2013

(87) PCT Pub. No.: WO2012/035790
PCT Pub. Date: Mar. 22, 2012

(65) Prior Publication Data
US 2013/0173824 A1 Jul. 4, 2013

(30) Foreign Application Priority Data
Sep. 16, 2010 (JP) ................................. 2010-208083

(51) Int. Cl.
*H04L 12/733* (2013.01)
*H04L 12/721* (2013.01)
*H04L 12/751* (2013.01)

(52) U.S. Cl.
CPC ................ *H04L 45/12* (2013.01); *H04L 45/02* (2013.01); *H04L 45/08* (2013.01); *H04L 45/126* (2013.01)

(58) Field of Classification Search
CPC ......... H04L 45/02; H04L 45/08; H04L 45/12; H04L 45/44; H04L 45/123; H04L 45/125; H04L 45/126
USPC .......................................... 709/238, 241, 252
See application file for complete search history.

(56) References Cited

U.S. PATENT DOCUMENTS 5,481,604 A * 1/1996 Minot ....................... 379/114.01
2009/0201899 A1 * 8/2009 Liu et al. ........................ 370/338

FOREIGN PATENT DOCUMENTS

JP 2006338515 A 12/2006

OTHER PUBLICATIONS

Li et al., "Naturally Adaptive Protocol for Wireless Sensor Networks Based on Slime Mold," Third IEEE International Conference on Self-Adaptive and Self-Organizing Systems, Sep. 18, 2009, pp. 280-281.*

(Continued)

*Primary Examiner* — Vivek Srivastava
*Assistant Examiner* — William C McBeth

(57) ABSTRACT

A selected node of a network of nodes determines a communication path through the network, by iteratively performing the following until a pipe diameter value (PDV) converges. An approximate pressure value (APV) of the selected node is determined by repeatingly acquiring an adjacent node's provisional pressure value (PPV), and updating a PPV of the selected node based on the PDV and a length of each of a number of links, the adjacent node's PPV, and the selected node's flux. After the selected node's APV is determined, an APV of the adjacent node is acquired, and a flux of each link is determined based on the PDV, the link's length, and the adjacent and selected nodes' APVs. The PDV is updated based on each link's flux that has been determined, the PDV, and a slime mold function, without acquiring and without using any PDV of the adjacent node.

15 Claims, 5 Drawing Sheets

(56) References Cited

OTHER PUBLICATIONS

Li et al., "Slime Mold Inspired Path Formation Protocol for Wireless Sensor Networks," ANTS'10 Proceedings of the 7th International Conference on Swarm Intelligence, Sep. 9, 2010, pp. 299-311.*
Li et al., "Slime Mold Inspired Protocol for Wireless Sensor Networks," Second IEEE International Conference on Self-Adaptive and Self-Organizing Systems, Oct. 24, 2008, pp. 319-328.*
Nakagaki et al., "Minimum-Risk Path Finding by an Adaptive Amoebal Network," Physical Review Letters, vol. 99, No. 6, Aug. 10, 2007.*
Tero et al., "Flow-network adaptation in Physarum amoebae," Theory in Biosciences, vol. 127, No. 2, May 2008, pp. 89-94.*
Tero et al., "Physarum solver: A biologically inspired method of road-network navigation," Physica A: Statistical Mechanics and its Applications, vol. 363, No. 1, Apr. 15, 2006, pp. 115-119.*
Li et al., "Slime mold inspired routing protocols for wireless sensor networks," Swarm Intelligence, vol. 5, No. 3, Dec. 2011, pp. 183-223.*
Zhang et al., "An Improved Maze Solving Algorithm Based on an Amoeboid Organism," 2011 Chinese Control and Decision Conference, May 23-25, 2011, pp. 1440-1443.*
Japanese Office Action for JP Application No. 2012-533878 mailed on Nov. 18, 2014 with English Translation.
The international search report for PCT/JP2011/052976 mailed on May 17, 2011.
Atsushi Tero, et al., "A mathematical model for adaptive transport network in path finding by true slime mold," Journal of Theoretical Biology, vol. 244, pp. 553-564, 2007.
Atsushi Tero, et al., "Rules for Biologically Inspired Adaptive Network Design," Science, vol. 327, pp. 439-442, Jan. 2010.
Yusuke Kitauchi, et al., "Proposal of maze search method by cellular automata with virtual slime-mold", Proceedings of the 2007 IEICE General Conference, Kiso—Kyokai, The Institute of Electronics, Information and Communication Engineers, Mar. 7, 2007 , p. 71.

* cited by examiner

PATH FINDING SYSTEM, COMPUTER, CONTROL METHOD, AND PROGRAM

This application is a National Stage Entry of PCT/JP2011/052976 filed Feb. 14, 2011, which claims priority from Japanese Patent Application 2010-208083 filed Sep. 16, 2010, the contents of all of which are incorporated herein by reference, in their entirety.

TECHNICAL FIELD

The present invention relates to a path finding system, a computer, a control method, and a program. In particular, the present invention relates to a path finding system that finds a path from a node that configures a network to another node, a computer functioning as the node that configures the network, a control method for controlling the computer, and a program for the computer.

BACKGROUND ART

A path finding problem is a problem of discovering a path that connects arbitrary nodes on a network. As path finding problems, there are various problem classes such as a shortest path problem, a tree construction problem, and redundant path construction.

A plasmodium of a true slime mold is known as an organism to resolve such problems. When the true slime mold is arranged within a maze in which foods are arranged at two arbitrary points, the true slime mold changes the shape of its own body in order to connect the foods at the two points by the shortest distance. Furthermore, even when foods are arranged at a great number of positions within the maze, the true slime mold is known to change the shape of its own body into the shape of a path that connects all the foods and has a short path length and excellent fault tolerance.

Non-Patent Documents 1 and 2 propose schemes of modeling behavior of a true slime mold focused on protoplasm flowing through the inside of a body of the true slime mold and simulating the behavior to resolve a path problem on a network. In Non-Patent Documents 1 and 2, a maze is treated as a graph including nodes and links, and is modeled such that a source or a sink of the protoplasm occurs in a node corresponding to the position of a food. For example, when foods are arranged at two points within the maze, a node corresponding to the position of one of the foods is a source node of the protoplasm, and a node corresponding to the position of the other food is a sink node of the protoplasm. In this case, a flux $Q_{ij}$ of the protoplasm flowing through a link ij connecting arbitrary nodes i and j is given as Formula (1).

[Formula 1]
$$Q_{ij} = D_{ij}/L_{ij} \cdot (p_j - p_i) \quad (1)$$

Here, $L_{ij}$ denotes the length of the link ij. $D_{ij}$ denotes a pipe diameter of the link ij, and the value of $D_{ij}$ is 0 when there is no link between the node i and the node j. $p_i$ denotes pressure of the node i and $p_j$ denotes pressure of the node j. The pressure of each node is obtained by solving Kirchhoff's law of Formula (2) for the flux of the protoplasm.

[Formula 2]
$$\sum_j Q_{ij} = I_i \quad (2)$$

Here, $I_i$ denotes a source flux of the protoplasm from the node i or a sink flux of the protoplasm into the node i. When the node i is a source node, the value of $I_i$ is −1. When the node i is a sink node, the value of $I_i$ is 1. When the node i is neither a source node nor a sink node, the value of $I_i$ is 0. In this case, the pipe diameter $D_{ij}$ of each link evolves over time in accordance with a differential evolution equation of Formula (3).

[Formula 3]
$$\frac{d}{dt} D_{ij} = f(Q_{ij}) - D_{ij} \quad (3)$$

The function f is a function that represents characteristics of the slime mold. It is known that when f(x)=abs(x), the pipe diameter of each link varies over time, a pipe diameter on a desired path converges on 1, and pipe diameters on the other paths converge on 0. It is to be noted that abs(x) is a function for calculating the absolute value of an argument x. For example, when foods are arranged at two points within the maze, a pipe diameter of a link corresponding to the shortest path that connects the two points converges on 1 and pipe diameters of the other links converge on 0. Accordingly, the desired path can be obtained by simulating time evolution of the pipe diameters and then extracting only a link whose pipe diameter has converged on 1.

PRIOR ART DOCUMENTS

Non-Patent Documents

Non-Patent Document 1: Atsushi Tero, Ryo Kobayashi, and Toshiyuki Nakagaki, "A mathematical model for adaptive transport network in path finding by true slime mold," Journal of Theoretical Biology, Vol. 244, pp. 553-564, 2007

Non-Patent Document 2: Atsushi Tero, Seiji Takagi, Tetsu Saigusa, Kentaro Ito, Dan P. Bebber, Mark D. Fricker, Kenji Yumiki, Ryo Kobayashi, and Toshiyuki Nakagaki, "Rules for Biologically Inspired Adaptive Network Design," Science, Vol. 327, pp. 439-442, Jan. 2010

SUMMARY OF INVENTION

Problems to be Solved by the Invention

However, in the schemes of Non-Patent Documents 1 and 2, the simulation of evolution of pipe diameters cannot be performed by the nodes in a distributed manner. This is because it is necessary to know the lengths and the pipe diameters of all the links within the network when one attempts to calculate pressure of each node by strictly solving Formula (2).

Means for Solving the Problems

An exemplary object of the present invention is to provide a path finding system, a computer, a control method, and a program that resolve the above-described problems.

In order to resolve the above-described problems, the present invention is a computer functioning as a node configuring a network, the computer including: an adjacent-node communication unit that acquires a provisional pressure value and an approximate pressure value of an adjacent node adjacent to the node itself from the adjacent node; an approximate-pressure-value calculation unit that calculates an approximate pressure value of the node itself using a pipe diameter value and the length of each link connected to the node itself, the provisional pressure value of the adjacent node, and a previously given source or sink flux of the node itself; a flux value calculation unit that calculates a flux flowing through each link using the pipe diameter value, the length, the approximate pressure value of the adjacent node, and the approximate pressure value of the node itself; and a pipe diameter value updating unit that updates the pipe diameter value using the flux flowing through each link, the pipe diameter value, and a function representing a feature of slime mold, wherein calculation of the approximate pressure value, calculation of the flux, and updating of the pipe diameter value are iteratively performed at least until the pipe diameter value converges.

Furthermore, the present invention is a control method for controlling a computer functioning as a node configuring a network, the control method including: acquiring a provisional pressure value and an approximate pressure value of an adjacent node adjacent to the node itself from the adjacent node; calculating an approximate pressure value of the node itself using a pipe diameter value and the length of each link connected to the node itself, the provisional pressure value of the adjacent node, and a previously given source or sink flux of the node itself; calculating a flux flowing through each link using the pipe diameter value, the length, the approximate pressure value of the adjacent node, and the approximate pressure value of the node itself; and updating the pipe diameter value using the flux flowing through each link, the pipe diameter value, and a function representing a feature of slime mold, wherein calculation of the approximate pressure value, calculation of the flux, and updating of the pipe diameter value are iteratively performed at least until the pipe diameter value converges.

Furthermore, the present invention is a program for a computer functioning as a node configuring a network, the program causing the computer to function as: an adjacent-node communication unit that acquires a provisional pressure value and an approximate pressure value of an adjacent node adjacent to the node itself from the adjacent node; an approximate-pressure-value calculation unit that calculates an approximate pressure value of the node itself using a pipe diameter value and the length of each link connected to the node itself, the provisional pressure value of the adjacent node, and a previously given source or sink flux of the node itself; a flux value calculation unit that calculates a flux flowing through each link using the pipe diameter value, the length, the approximate pressure value of the adjacent node, and the approximate pressure value of the node itself; and a pipe diameter value updating unit that updates the pipe diameter value using the flux flowing through each link, the pipe diameter value, and a function representing a feature of slime mold, and causing calculation of the approximate pressure value, calculation of the flux, and updating of the pipe diameter value to be iteratively performed at least until the pipe diameter value converges.

It is to be noted that the Summary of Invention described above does not enumerate all the necessary features of the present invention, and sub-combinations of such a group of features may also be the invention.

Exemplary Advantageous Effects of Invention

As is apparent from the above description, the present invention can provide a system in which respective nodes resolve a path finding problem on a network in an autonomously and distributed manner without knowing information of the entire network.

MODES FOR CARRYING OUT THE INVENTION

Hereinafter, the present invention will be described through exemplary embodiments and examples. However, the following exemplary embodiments and examples do not limit the invention in accordance with the claims. Moreover, not all the combinations of features described in the exemplary embodiments and examples are necessarily essential as the solution of the present invention.

Figure 1:
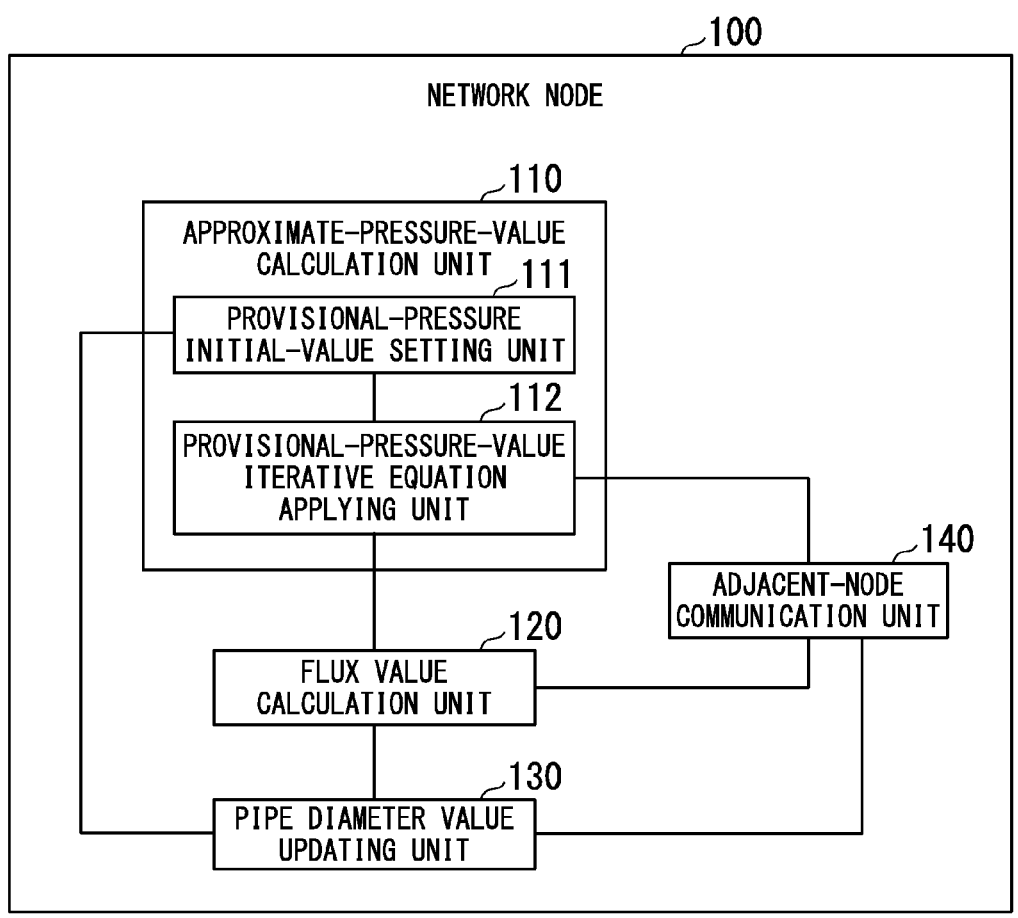
FIG. 1 is a block diagram illustrating a configuration of a network node in a path finding system in accordance with an exemplary embodiment of the present invention.

An exemplary embodiment of the present invention is characterized in that each node within a network has a function illustrated in FIG. 1. Referring to FIG. 1, each network node 100 includes an approximate-pressure-value calculation unit 110 that calculates an approximate pressure value of the node itself, a flux value calculation unit 120 that calculates a flux flowing through a link connected to the node itself (an adjacent link), a pipe diameter value updating unit 130 that updates a pipe diameter of the link connected to the node itself, and an adjacent-node communication unit 140 that communicates with a node adjacent to the node itself (an adjacent node).

The approximate pressure calculation unit 110 includes a provisional-pressure-value initial-value setting unit 111 that sets an initial value of a provisional pressure value, and a provisional-pressure-value iterative equation applying unit 112 that iteratively updates the provisional pressure value.

Each of these functional blocks generally operates as follows. It is to be noted that operation in a node i will be described in the following description, but the same applies to operation in any node.

The provisional-pressure initial-value setting unit 111 sets an initial value of a provisional pressure value for calculating an approximate pressure value of the node itself. A set value of the initial value is arbitrary. For example, when an approximate pressure value when the initial value is set is used, the initial value of the provisional pressure value is represented by Formula (4). Here, $p_i$ denotes the approximate pressure value of the node i, and $\pi_i^k$ denotes the provisional pressure value of the node i when the iterative equation has been applied k times (k is an integer equal to or greater than 0).

[Formula 4]

$$\pi_i^0 \leftarrow p_i \qquad (4)$$

The provisional-pressure-value iterative equation applying unit 112 applies an iterative equation about the provisional pressure value represented by Formula (5) a predetermined number of times N, which is given in advance, and outputs a calculated provisional pressure value $\pi_i^N$ as an approximate pressure value $p_i$ (see Formula (6)). Here, $s_p$ is a predetermined value that satisfies $0<s_p<1$, which is given in advance.

[Formula 5]

$$\pi_i^k \leftarrow \frac{s_p}{\sum_{j \neq i} D_{ij}/L_{ij}} \left( \sum_{j \neq i} D_{ij}/L_{ij} \cdot (\pi_j^{k-1} - \pi_i^{k-1}) - I_i \right) + \pi_i^{k-1} \quad (5)$$

[Formula 6]

$$p_i \leftarrow \pi_i^N \quad (6)$$

In Formula (5), a sum is calculated for all the nodes other than the node i within the network in two positions in Formula (5). However, for a node j having no link with the node i, $D_{ij}=0$, and thus Formula (5) is equivalent to Formula (7). Here, nbr(i) denotes a set of indexes of nodes adjacent to the node i.

[Formula 7]

$$\pi_i^k \leftarrow \frac{s_p}{\sum_{j \in nbr(i)} D_{ij}/L_{ij}} \left( \sum_{j \in nbr(i)} D_{ij}/L_{ij} \cdot (\pi_j^{k-1} - \pi_i^{k-1}) - I_i \right) + \pi_i^{k-1} \quad (7)$$

The flux value calculation unit 120 calculates a flux $Q_{ij}$ of each link between the node i and an adjacent node using Formula (1).

The pipe diameter value updating unit 130 updates a pipe diameter $D_{ij}$ of each link between the node i and an adjacent node using Formula (8). It is to be noted that $s_d$ denotes a predetermined value that satisfies $0<s_d<1$, which is given in advance.

[Formula 8]

$$D_{ij} \leftarrow D_{ij} + s_d(f(Q_{ij}) - D_{ij}) \quad (8)$$

The adjacent-node communication unit 140 is a block that communicates with each node adjacent to the node i. The adjacent-node communication unit 140 performs transmission and reception of the provisional pressure value or the approximate pressure value in response to a request from the provisional-pressure-value iterative equation applying unit 112 or the flux value calculation unit 120. It is to be noted that when a device provided separately from the network node 100 constructs a found path, the adjacent-node communication unit 140 acquires the pipe diameter value from the pipe diameter value updating unit 130 and transmits the acquired pipe diameter value to the outside of the network node 100. An arbitrary communication protocol may be used.

Figure 2:
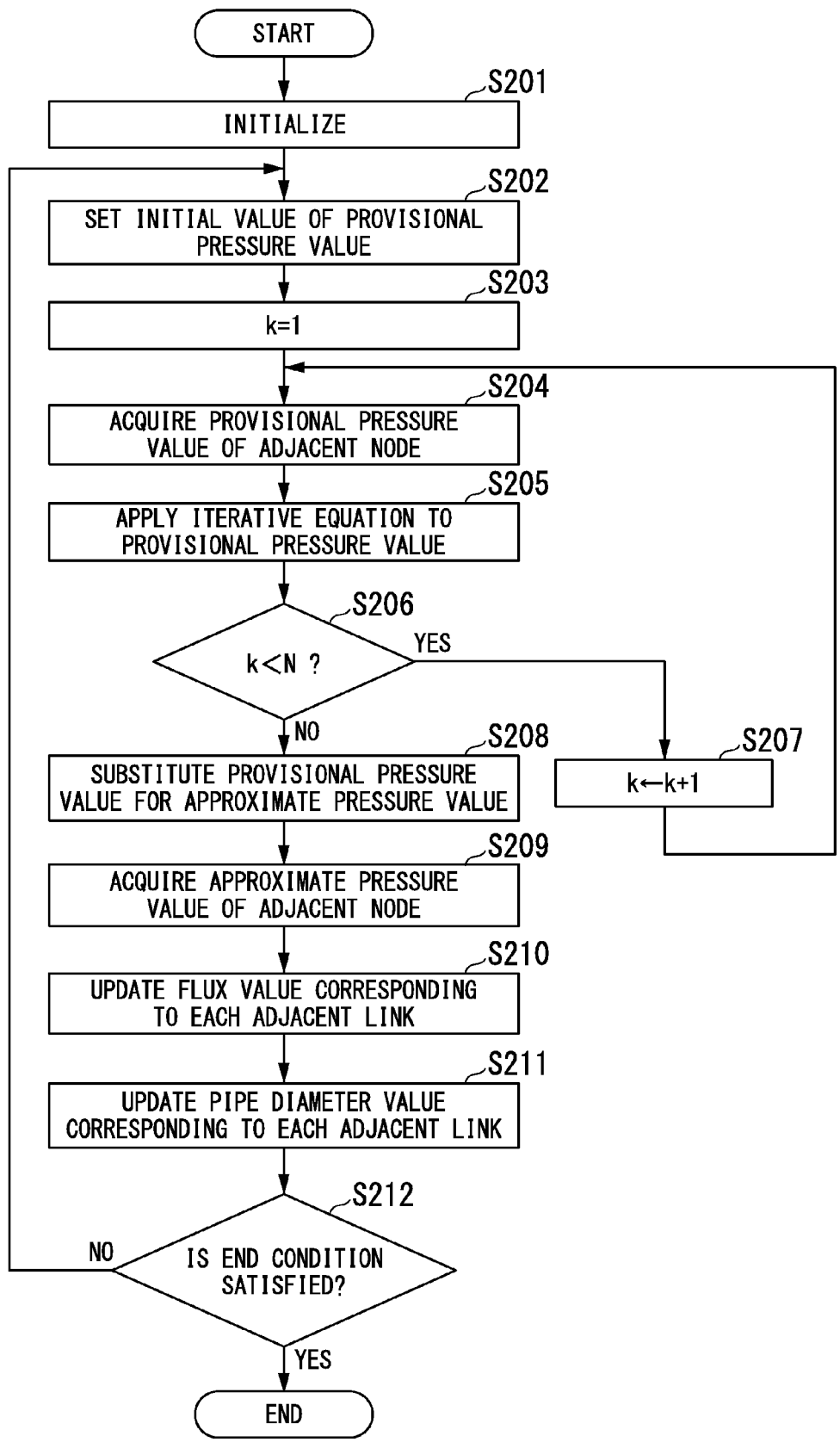
FIG. 2 is a flowchart illustrating operation of the network node in the path finding system in accordance with an exemplary embodiment of the present invention.

Next, an entire operation of the present exemplary embodiment will be described in detail with reference to FIG. 1 and a flowchart of FIG. 2.

First, a link length $L_{ij}$ and an initial value $D_{ij}$ of the pipe diameter of a link connected to the node itself, $I_i$ indicating a source quantity from the node itself or a sink quantity into the node itself, and an initial value $p_i$ of an approximate pressure value are given in initialization (step S201). It is to be noted that for $I_i$, −1 is given to a computer corresponding to the source node, 1 is given to a computer corresponding to a sink node, and 0 is given to computers corresponding to the nodes other than these nodes.

Next, the provisional-pressure initial-value setting unit 111 sets the provisional pressure value $\pi_i^0$ of the node i using a predetermined method (e.g., a method in accordance with Formula (4)) (step S202).

Next, the provisional-pressure-value iterative equation applying unit 112 initializes the value of the number of iterations k to 1 (step S203).

The provisional-pressure-value iterative equation applying unit 112 causes the adjacent-node communication unit 140 to acquire a provisional pressure value $\pi_j^{(k-1)}$ of each adjacent node (step S204). Furthermore, the provisional-pressure-value iterative equation applying unit 112 calculates the provisional pressure value $\pi_i^k$ of the node itself in accordance with Formula (7) using the pipe diameter $D_{ij}$ and the link length $L_{ij}$ of each link between the node itself and an adjacent node (an adjacent link), the provisional pressure value $\pi_j^{(k-1)}$ of each adjacent node, the provisional pressure value $\pi_i^{(k-1)}$ of the node itself, the source or sink flux $I_i$ from the node itself or into the node itself, and the value $s_p$ (step S205).

The provisional-pressure-value iterative equation applying unit 112 iteratively performs steps S204 and S205 a predetermined number of times N, which is given in advance (steps S206 and S207). After the N iterations end, the provisional-pressure-value iterative equation applying unit 112 substitutes the obtained provisional pressure value $\pi_i^N$ for the approximate pressure value of the node itself (step S208).

Next, the flux value calculation unit 120 causes the adjacent-node communication unit 140 to acquire an approximate pressure value $p_j$ of each adjacent node (step S209). Furthermore, the flux value calculation unit 120 updates the value of the flux $Q_{ij}$ corresponding to each adjacent link in accordance with Formula (1) using the pipe diameter $D_{ij}$ and the link length $L_{ij}$ of each adjacent link, the approximate pressure value $p_j$ of each adjacent node, and the approximate pressure value $p_i$ of the node itself (step S210).

Next, the pipe diameter value updating unit 130 updates the pipe diameter value $D_{ij}$ corresponding to each adjacent link in accordance with Formula (8) using a current pipe diameter $D_{ij}$ of each adjacent link, the flux $Q_{ij}$ of each adjacent link, the value $s_d$, and the function f (step S211).

The above process from step S202 to step S211 is iteratively performed until a predetermined end condition is satisfied (step S212). For example, a condition such as when the process from step S202 to step S211 is iteratively performed a predetermined number of times, which is given in advance, is used as the end condition. However, the process from step S202 to step S211 is iteratively performed at least until the pipe diameter of each adjacent link converges on 0 or 1.

Figure 5:
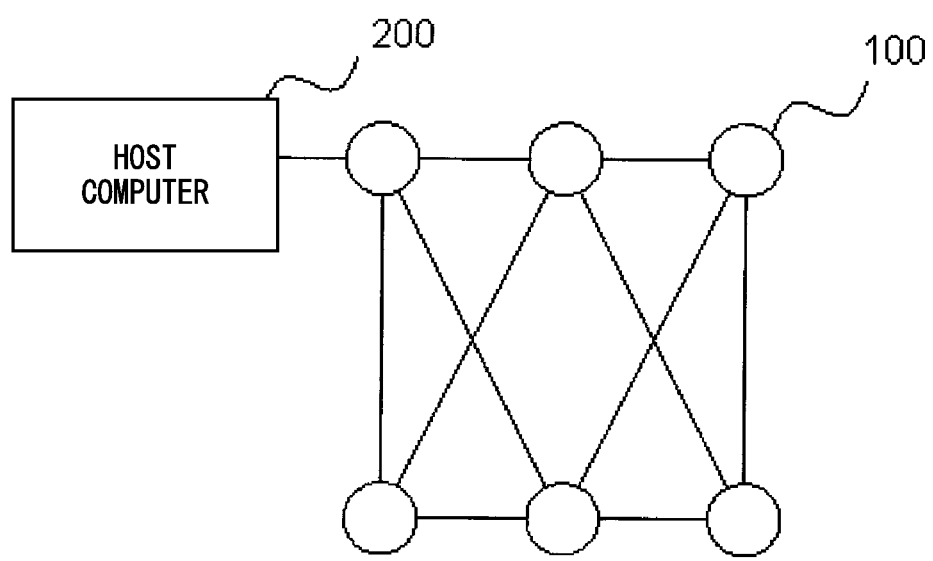
FIG. 5 is a diagram illustrating an example of the entire path finding system.

As described above, since a path is found by extracting only links whose pipe diameter converges on 1, the found path is constructed from the extracted links. For example, each network node 100 on a path between the source node and the sink node of the protoplasm extracts two adjacent links whose pipe diameter converges on 1 and transfers communication received from one of the links to the other link. As a result, a communication path between the source node and the sink node of the protoplasm is constructed. Alternatively, as illustrated in FIG. 5, a host computer 200 is provided in the network separately from the network nodes 100. It is to be noted that in FIG. 5, in order to avoid complexity, a reference numeral 100 is assigned to only part of the network nodes. The host computer 200 collects a pipe diameter value corresponding to each adjacent link from each network node 100, extracts links having the pipe diameter of 1 based on the collected pipe diameter values, and connects the extracted links to construct a path between the source node and the sink node. Alternatively, each network node 100 may extract the links having the pipe diameter of 1 based on the pipe diameter value corresponding to each adjacent link, and the host computer 200 may collect information about the links and connect the links indicated by the collected information to construct the path. Alternatively, a specific network node (e.g., a predetermined node, a source node of the protoplasm, or a sink node of the protoplasm) may perform the same operation as the host computer 200 instead of providing the host computer 200 separately from the network nodes. It is to be noted that the host computer 200 (or the specific network node) may use various schemes known in the field of a network to acquire the pipe diameter value or information about the link having the pipe diameter of 1 from each network node 100 (or other network nodes).

Next, exemplary advantageous effects of the present exemplary embodiment will be described. In the present exemplary embodiment, the approximate pressure value is calculated using Formula (7) including only the values held in the node itself and the provisional pressure value of the adjacent nodes. Furthermore, all the steps other than the step of calculating the approximate pressure value may also be executed using only the values held in the node itself and a value that can be acquired from the adjacent nodes. As a result, in the present exemplary embodiment, the simulation of the true slime mold is realized in an autonomously and distributed manner in each node.

It is to be noted that the present invention may be realized as a path finding program that causes a computer to function as the node constructing the path finding system. The computer includes a central processing unit (CPU) that reads a path finding program and executes the read path finding program, a storage device (e.g., a hard disk) that stores the provisional pressure value and the approximate pressure value of the node itself, the link length and the pipe diameter of each adjacent link, etc. and a communication interface for communication with an adjacent computer.

Next, a specific example of the present invention is shown. Here, $s_p$ and $s_d$ were equal to 0.5, N was equal to 1, the initial values $p_i$ of the approximate pressure values for all the nodes i were 0, the initial values $D_{ij}$ of the pipe diameters for all the links ij were equal to 0, and the function f of Formula (8) was f(x)=abs(x). A Barabashi-Albert model in which the number of nodes is 100 was used as a target network, and the shortest path between two randomly selected points was found.

Figure 3:
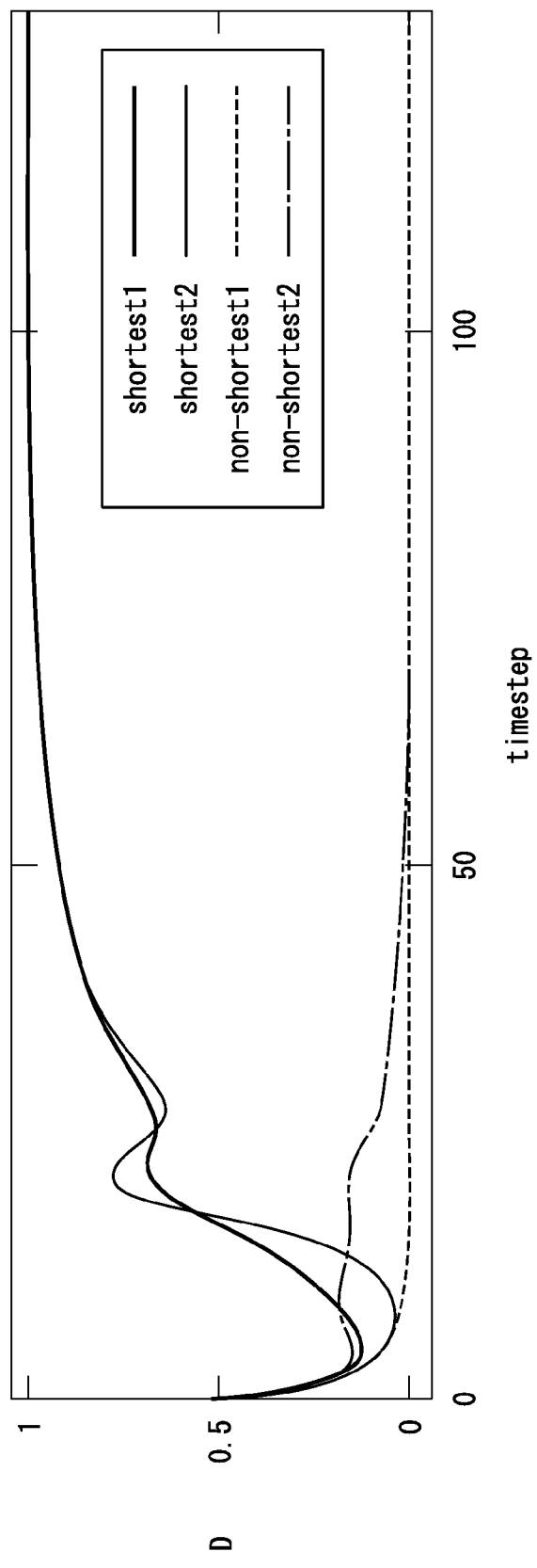
FIG. 3 is a diagram illustrating time evolution of a pipe diameter in an example of the present invention.
Figure 4:
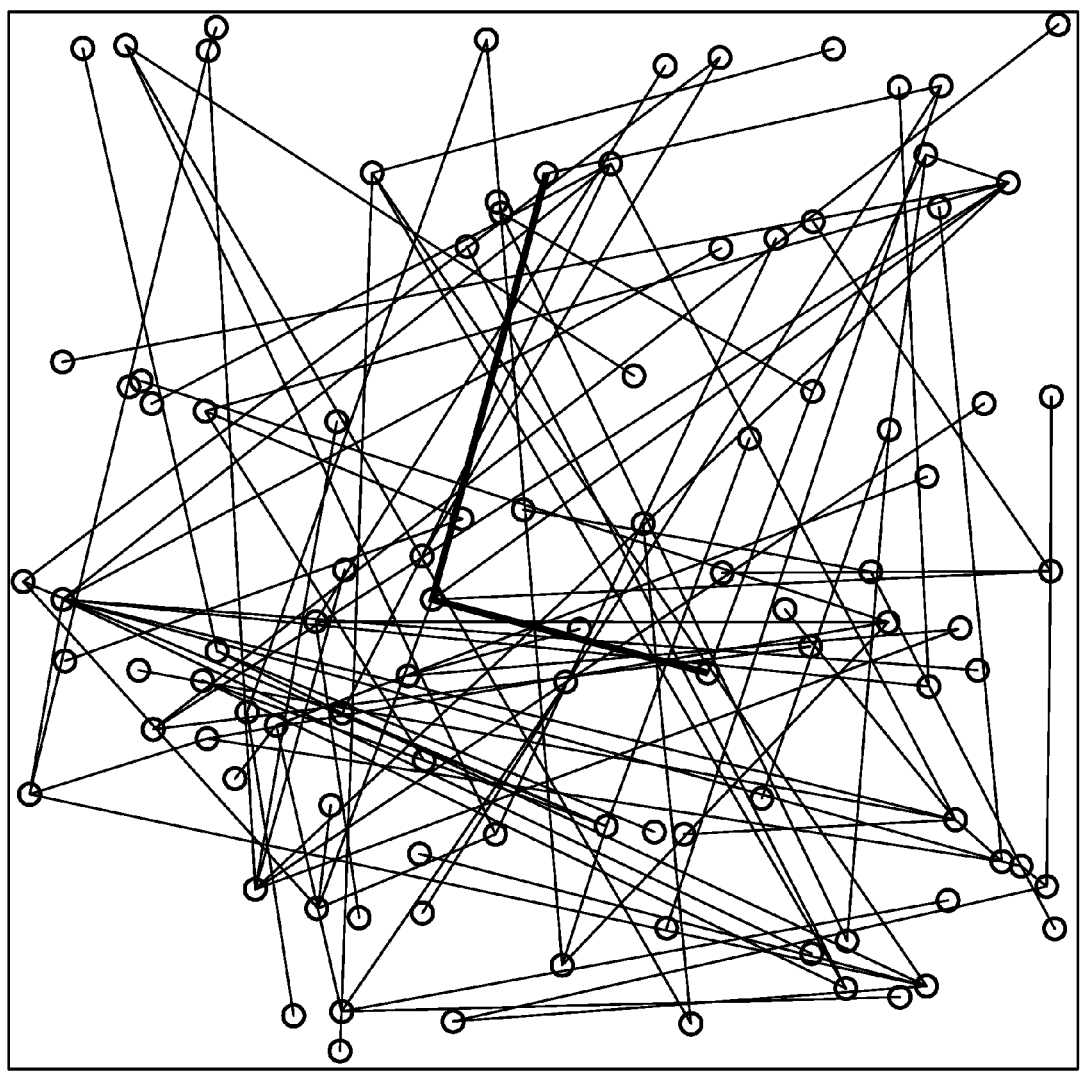
FIG. 4 is a diagram illustrating a path obtained in an example of the present invention.

In FIG. 3, the manner of time evolution on a shortest path (shortest1 or shortest2) and a non-shortest path (non-shortest1 or non-shortest2) is shown. Furthermore, the obtained path is illustrated in FIG. 4. The pipe diameter on a shortest path converges on 1, the pipe diameter on a non-shortest path converges on 0, and the shortest path is obtained correctly.

The present invention has been described above with reference to the exemplary embodiments and examples, but the technical scope of the present invention is not limited to the exemplary embodiments and examples described above. It is apparent to those skilled in the art that various changes or improvements may be made to the above exemplary embodiments and examples. It is apparent from the claims that such changes or improvements fall within the technical scope of the present invention.

This application is based upon and claims the benefit of priority from Japanese Patent Application No. 2010-208083, filed on Sep. 16, 2010, the disclosure of which is incorporated herein in its entirety by reference.

INDUSTRIAL APPLICABILITY

The present invention is applicable for uses of a path finding system on a communication network or a program for realizing the path finding system in a computer. The present invention can provide a system in which each node resolves the path finding problem on the network in an autonomously and distributed manner without knowing information of the entire network.

DESCRIPTION OF REFERENCE NUMERALS 100 network node
110 approximate-pressure-value calculation unit
111 provisional-pressure initial-value setting unit
112 provisional-pressure-value iterative equation applying unit
120 flux value calculation unit
130 pipe diameter value updating unit
140 adjacent-node communication unit
200 host computer

What is claimed is:

1. A computing device comprising:
   communication hardware to communicatively connect to a network of a plurality of nodes, the computing device being a selected node of the network;
   a processor; and
   a non-transitory computer-readable data storage medium storing computer-executable code executable by the processor to determine a communication path through the network by at least:
   iteratively:
      determining an approximate pressure value of the selected node by repeatedly acquiring a provisional pressure value of an adjacent node on the network, and then updating a provisional pressure value of the selected node based on a pipe diameter value and a length of each of a plurality of links of the network to which the selected node is connected, the provisional pressure value of the adjacent node, and a flux of the selected node;
      after determining the approximate pressure value of the selected node, acquiring an approximate pressure value of the adjacent node, and then determining a flux of each link based on the pipe diameter value, the length of the link, the approximate pressure value of the adjacent node, and the approximate pressure value of the selected node that has been determined;
      updating the pipe diameter value based on the flux of each link that has been determined, the pipe diameter value, and a slime mold function, without acquiring and without using any pipe diameter value of the adjacent node,
   until the pipe diameter value converges to a predetermined value; and
   using the communication path to communicate through the network.

2. The computing device of claim 1, wherein the provisional pressure value of the selected node is set to an initial value,
   and wherein determining the approximate pressure value of the selected node comprises applying an iterative equation to the provisional pressure value of the selected node to realize the approximate pressure value of the selected node.

3. The computing device of claim 2, wherein the iterative equation is:

$$\pi_i^k \leftarrow \frac{s_p}{\sum_{j \in nbr(i)} D_{ij}/L_{ij}} \left( \sum_{j \in nbr(i)} D_{ij}/L_{ij} \cdot (\pi_j^{k-1} - \pi_i^{k-1}) - I_i \right) + \pi_i^{k-1}$$

wherein provisional pressure value of the selected node in repetition k is $\pi_i^k$, the selected node is i, the pipe diameter value is $D_{ij}$, the length of a link from the selected node to an adjacent node j is $L_{ij}$, the provisional pressure value of the adjacent node is $\pi_j^{k-1}$, the flux of the selected node is $I_i$, the provisional pressure value of the selected node in repetition k−1 is $\pi_i^{k-1}$, a set of adjacent nodes is nbr(i), and a value $s_p$, is greater than zero and less than 1.

4. The computing device of claim 2, wherein the approximate pressure value of the selected node is set to the initial value of the provisional pressure value.

5. The computing device of claim 1, wherein computer-executable code is executable by the processor to further:
communicate the flux of the selected node to other nodes within the network.

6. A method comprising:
determining, by a computing device communicatively connected to a network of a plurality of nodes including a selected node that is the computing device, a communication path through the network, by at least:
iteratively:
determining an approximate pressure value of the selected node by repeatedly acquiring a provisional pressure value of an adjacent node on the network, and then updating a provisional pressure value of the selected node based on a pipe diameter value and a length of each of a plurality of links of the network to which the selected node is connected, the provisional pressure value of the adjacent node, and a flux of the selected node;
after determining the approximate pressure value of the selected node, acquiring an approximate pressure value of the adjacent node, and then determining a flux of each link based on the pipe diameter value, the length of the link, the approximate pressure value of the adjacent node, and the approximate pressure value of the selected node that has been determined;
updating the pipe diameter value based on the flux of each link that has been determined, the pipe diameter value, and a slime mold function, without acquiring and without using any pipe diameter value of the adjacent node,
until the pipe diameter value converges to a predetermined value; and
using the communication path to communicate through the network.

7. The method of claim 6, wherein the provisional pressure value of the selected node is set to an initial value,
and wherein determining the approximate pressure value of the selected node comprises applying an iterative equation to the provisional pressure value of the selected node to realize the approximate pressure value of the selected node.

8. The method of claim 7, wherein the iterative equation is:

$$\pi_i^k \leftarrow \frac{s_p}{\sum_{j \in nbr(i)} D_{ij}/L_{ij}} \left( \sum_{j \in nbr(i)} D_{ij}/L_{ij} \cdot (\pi_j^{k-1} - \pi_i^{k-1}) - I_i \right) + \pi_i^{k-1}$$

wherein provisional pressure value of the selected node in repetition k is $\pi_i^k$, the selected node is i, the pipe diameter value is $D_{ij}$, the length of a link from the selected node to an adjacent node j is $L_{ij}$, the provisional pressure value of the adjacent node is $\pi_j^{k-1}$, the flux of the selected node is $I_i$, the provisional pressure value of the selected node in repetition k-1 is $\pi_i^{k-1}$ a set of adjacent nodes is nbr(i), and a value $s_p$, is greater than zero and less than 1.

9. The method of claim 7, wherein the approximate pressure value of the selected node is set to the initial value of the provisional pressure value.

10. The method of claim 6, further comprising:
communicating the flux of the selected node to other nodes within the network.

11. A non-transitory computer-readable data storage medium storing computer-executable code that a processor of a computing device executes to perform a method, the computing device communicatively connected to a network of a plurality of nodes, the computing device being a selected node of the network, the method comprising:
determining a communication path through the network, by at least:
iteratively:
determining an approximate pressure value of the selected node by repeatedly acquiring a provisional pressure value of an adjacent node on the network, and then updating a provisional pressure value of the selected node based on a pipe diameter value and a length of each of a plurality of links of the network to which the selected node is connected, the provisional pressure value of the adjacent node, and a flux of the selected node;
after determining the approximate pressure value of the selected node, acquiring an approximate pressure value of the adjacent node, and then determining a flux of each link based on the pipe diameter value, the length of the link, the approximate pressure value of the adjacent node, and the approximate pressure value of the selected node that has been determined;
updating the pipe diameter value based on the flux of each link that has been determined, the pipe diameter value, and a slime mold function, without acquiring and without using any pipe diameter value of the adjacent node,
until the pipe diameter value converges to a predetermined value; and
using the communication path to communicate through the network.

12. The non-transitory computer-readable data storage medium of claim 11, wherein the provisional pressure value of the selected node is set to an initial value,
and wherein determining the approximate pressure value of the selected node comprises applying an iterative equation to the provisional pressure value of the selected node to realize the approximate pressure value of the selected node.

13. The non-transitory computer-readable data storage medium of claim 12, wherein the iterative equation is:

$$\pi_i^k \leftarrow \frac{s_p}{\sum_{j \in nbr(i)} D_{ij}/L_{ij}} \left( \sum_{j \in nbr(i)} D_{ij}/L_{ij} \cdot (\pi_j^{k-1} - \pi_i^{k-1}) - I_i \right) + \pi_i^{k-1}$$

wherein provisional pressure value of the selected node in repetition k is $\pi_i^k$, the selected node is i, the pipe diameter value is $D_{ij}$, a set of adjacent nodes is nbr(i), the provisional pressure value of the adjacent node is $\pi_j^{k-}$, the flux of the selected node is $l_i$, the provisional pressure value of the selected node in repetition k-1 is $\pi_i^{k-1}$, the length of a link to an adjacent node j within the set of adjacent nodes is $L_{ij}$, and a value $s_p$ is greater than zero and less than one.

14. The non-transitory computer-readable data storage medium of claim 12, wherein the approximate pressure value of the selected node is set to the initial value of the provisional pressure value.

15. The non-transitory computer-readable data storage medium of claim 11, further comprising:
communicating the flux of the selected node to other nodes within the network.

* * * * *